H. J. SPIEGELBERG.
WATER WARMER FOR POULTRY.
APPLICATION FILED MAY 9, 1918.
1,283,585.
Patented Nov. 5, 1918.
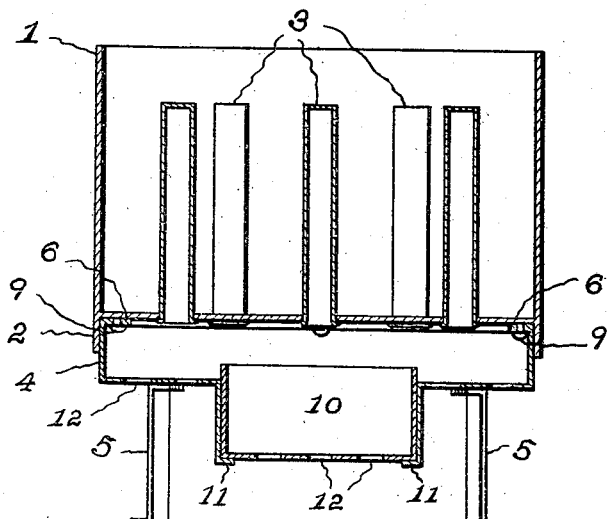
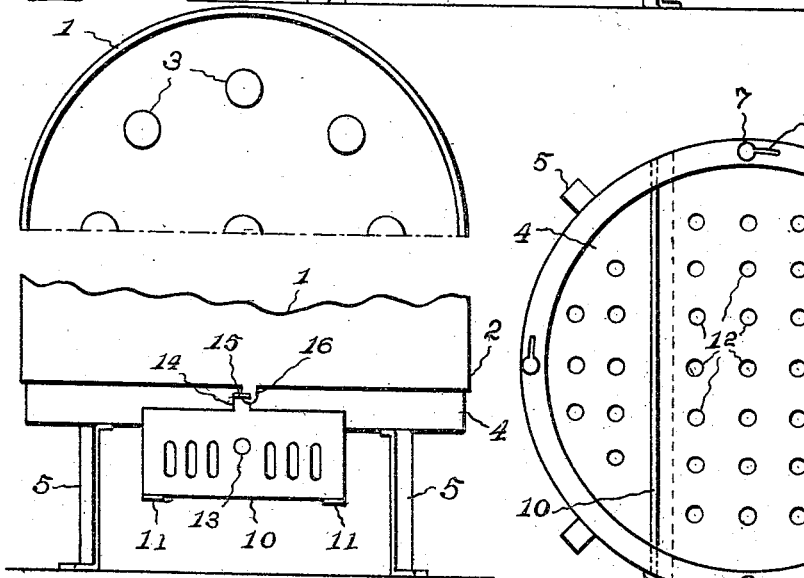
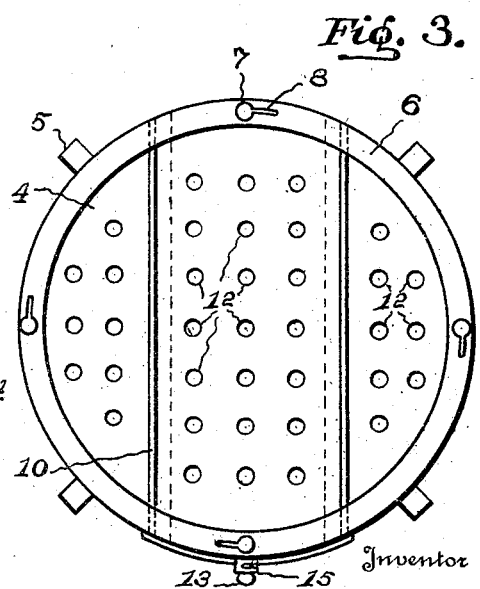
H. J. Spiegelberg

UNITED STATES PATENT OFFICE.

HARVEY JULIUS SPIEGELBERG, OF LARSEN, WISCONSIN.

WATER-WARMER FOR POULTRY.

1,283,585.

Specification of Letters Patent.

Patented Nov. 5, 1918.

Application filed May 9, 1918. Serial No. 233,551.

*To all whom it may concern:*

Be it known that I, HARVEY JULIUS SPIEGELBERG, a citizen of the United States, residing at Larsen, in the county of Winnebago, State of Wisconsin, have invented a new and useful Water-Warmer for Poultry; and I do hereby declare the following to be a full, clear, and exact description of the invention, such as will enable others skilled in the art to which it appertains to make and use the same.

The present invention relates to a water warmer for poultry and live stock, and has for its object to provide a device of this character which embodies novel features of construction whereby a comparatively small charge of fuel which can be readily renewed at proper intervals of time will keep the drinking water for poultry warm and prevent the same from freezing in cold weather.

Further objects of the invention are to provide a water warmer which is comparatively simple and inexpensive in its construction, which can be readily assembled or taken apart, which enables the water to be warmed and prevented from freezing at very little expense and with very little trouble, and which can be used with absolute safety.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical sectional view through a water warmer for poultry constructed in accordance with the invention.

Fig. 2 is a front view of the base thereof.

Fig. 3 is a top plan view of the heating shell and fuel drawer, the water receptacle being removed.

Fig. 4 is a top plan view of a portion of the water receptacle.

Corresponding and like parts are referred to in the following description and indicated in all the views of the drawings by the same reference characters.

Referring to the drawings, which illustrate one embodiment of the invention, the numeral 1 designates a water receptacle which is substantially cylindrical in shape, being open at the top and surrounded at the bottom by a peripheral flange 2. A number of hollow flue members 3 project upwardly into the water receptacle from the bottom thereof, said hollow flue members opening through the bottom of the receptacle and having a large surface area for contact with the water in the receptacle. This water receptacle fits upon a correspondingly shaped heating shell 4, said shell being supported in a suitable manner as by means of the legs 5, and having the open top thereof closed by the receptacle 1 when the latter is in position. An inwardly projecting flange 6 extends around the mouth of the heating shell 4 and is provided at intervals with openings 7 which communicate with circumferentially extending narrow slotted portions 8. The flange 2 of the receptacle 1 fits snugly around the exterior of the heating shell 4 at the top thereof, and headed studs 9 which project downwardly from the bottom of the receptacle are adapted to pass through the openings 7 in the flange 6 of the heating shell and be rotated into an interlocking engagement with the narrow slots 8. In this manner the water receptacle is applied to the heating shell and locked in position thereon.

The bottom of the heating shell 4 is formed with a diametrically extending depressed portion providing a fire box. A drawer 10 is slidable in this depressed portion, being supported at the edges thereof by the flanges 11, and being removable through the front of the heater. This drawer is intended to receive a brick of charcoal or like fuel and both the drawer and bottom of the heating shell are formed with air openings 12 through which the necessary air for combustion can enter the heater. For the average heater an ordinary charcoal brick will be sufficient for twenty-four hours, and the heater can be kept in continuous operation by supplying a brick of charcoal to the heater each day.

The drawer 10 is shown as removable through the front of the heater, being provided at the forward end thereof with a handle 13 and an upstanding arm 14 which has a slotted flange 15 at the end thereof. An ear 16 which projects downwardly from the flange 2 of the water receptacle enters the slotted portion of the flange 15 when the water receptacle is rotated to bring about an interlocking connection between the headed studs 9 and the slots 8. The charcoal drawer is thus locked in position at the same time that the water receptacle is locked upon the heating shell, and there is thus no danger of the parts accidentally coming loose and permitting the fire to scatter. In order to release the charcoal drawer 10 when it is desired to supply a fresh charge of fuel thereto, it is merely necessary to rotate the water receptacle 1 slightly and disengage the ear 16 from the flange 15. It will be obvious that when the heater is in operation the flue members 3 and bottom of the receptacle 1 present a large heating area to the water in the receptacle, so that just a very slight amount of fire is all that is necessary to keep the water warm and prevent it from freezing.

Having thus described the invention, what I claim as new and desire to secure by Letters Patent, is:—

1. A water warmer including an upright heating shell having an open top, a fuel receiving drawer mounted within the bottom of the shell and slidable outwardly through one side thereof, a water receptacle formed with a flanged base which rests rotatably upon the top of the heating shell and closes the same, an interlocking connection between the flanged base of the water receptacle and the shell, said interlocking connection being controlled by the rotation of the receptacle on the shell, and locking means for the fuel drawer which is also controlled by the rotation of the receptacle on the shell.

2. A water warmer including an upright heating shell having an open top, a fuel receiving drawer slidably mounted within the bottom of the shell and removable laterally through one side thereof, said drawer carrying an outstanding slotted flange, a water receptacle having a flanged base which fits rotatably upon the top of the shell and incloses the same, a bayonet slot connection between the flanged base of the receptacle and the shell, said bayonet slot connection being controlled by rotation of the receptacle upon the shell, and an ear projecting from the receptacle and rotatable into engagement with the slotted flange of the drawer to lock the drawer in a closed position when the receptacle is locked upon the shell.

In testimony whereof I have signed my name to this specification in the presence of two subscribing witnesses.

HARVEY JULIUS SPIEGELBERG.

Witnesses:
H. C. RILEY,
JULIUS SPIEGELBERG.

Copies of this patent may be obtained for five cents each, by addressing the "Commissioner of Patents, Washington, D. C."